US012082989B2

(12) United States Patent
Scherer

(10) Patent No.: US 12,082,989 B2
(45) Date of Patent: Sep. 10, 2024

(54) DENTAL IMPLANT SYSTEM WITH AT LEAST ONE TOOTH IMPLANT AND SEPARATE ABUTMENT

(71) Applicant: Johannes Scherer, Kissing (DE)

(72) Inventor: Johannes Scherer, Kissing (DE)

( * ) Notice: Subject to any disclaimer, the term of this patent is extended or adjusted under 35 U.S.C. 154(b) by 170 days.

(21) Appl. No.: 16/700,151

(22) Filed: Dec. 2, 2019

(65) Prior Publication Data

US 2020/0121425 A1 Apr. 23, 2020

Related U.S. Application Data

(63) Continuation of application No. PCT/DE2018/000155, filed on May 23, 2018.

(30) Foreign Application Priority Data

Jun. 14, 2017 (DE) .................... DE102017005618.8

(51) Int. Cl.
*A61C 8/00* (2006.01)

(52) U.S. Cl.
CPC .......... *A61C 8/0022* (2013.01); *A61C 8/0012* (2013.01); *A61C 8/0068* (2013.01); *A61C 2008/0046* (2013.01)

(58) Field of Classification Search
CPC ... A61C 8/0022; A61C 8/0012; A61C 8/0068; A61C 8/0006; A61C 2008/0046; A61C 8/0069; A61C 8/005; A61C 8/0018; A61C 8/0075; A61C 8/0037; A61C 8/0045; A61C 8/0054; A61C 8/0056
See application file for complete search history.

(56) References Cited

U.S. PATENT DOCUMENTS

| 5,209,659 | A | * | 5/1993 | Friedman | A61C 8/0054 433/173 |
| 5,573,401 | A | | 11/1996 | Davidson et al. | |
| 6,227,856 | B1 | * | 5/2001 | Beaty | A61C 8/0001 433/172 |
| 8,529,261 | B2 | * | 9/2013 | Schonenberger | A61C 8/0066 433/172 |
| 2007/0068647 | A1 | * | 3/2007 | Baliktay | C22F 1/183 164/76.1 |
| 2007/0160955 | A1 | * | 7/2007 | Han | A61C 8/005 433/173 |
| 2007/0202465 | A1 | * | 8/2007 | Schonenberger | A61C 8/0077 433/173 |

(Continued)

FOREIGN PATENT DOCUMENTS

| CN | 103014389 A * | 4/2013 | |
| DE | 102015100117 A1 | 7/2016 | |
| WO | WO-2012069178 A1 * | 5/2012 | ............. A61C 8/005 |

*Primary Examiner* — Jacqueline T Johanas
*Assistant Examiner* — Shannel Nicole Belk
(74) *Attorney, Agent, or Firm* — Von Rohrscheidt Patents

(57) ABSTRACT

A dental implant system, comprising: a tooth implant, and a separate abutment that is attachable or attached at the tooth implant by an attachment bolt, wherein the tooth implant is made from a first material with an elasticity modulus between 15 GPa and 75 GPa, wherein the abutment is made from a second material with an elasticity modulus greater than 100 GPa, and wherein the attachment bolt is made from the first material or the second material.

11 Claims, 4 Drawing Sheets

(56) References Cited

U.S. PATENT DOCUMENTS

| | | | |
|---|---|---|---|
| 2013/0045360 A1* | 2/2013 | Ibacache | A61F 2/30771 |
| | | | 148/284 |
| 2013/0344458 A1* | 12/2013 | Taha | A61C 8/0022 |
| | | | 433/174 |
| 2014/0272792 A1* | 9/2014 | Haralampopoulos | ......... |
| | | | A61C 8/0075 |
| | | | 433/173 |
| 2014/0277559 A1* | 9/2014 | Picha | A61L 27/18 |
| | | | 623/23.5 |
| 2014/0329201 A1* | 11/2014 | Cottrell | A61C 8/0025 |
| | | | 433/173 |
| 2016/0143712 A1* | 5/2016 | Moser | A61C 8/0025 |
| | | | 433/173 |
| 2018/0161128 A1* | 6/2018 | Smith | A61C 8/0068 |
| 2018/0344432 A1* | 12/2018 | Funk | A61C 9/004 |

\* cited by examiner

DENTAL IMPLANT SYSTEM WITH AT LEAST ONE TOOTH IMPLANT AND SEPARATE ABUTMENT

RELATED APPLICATIONS

This application is a continuation of International application PCT/DE2018/000155 filed on May 23, 2018 that claims priority from German patent application DE 10 2017 005 618.8 filed on Jun. 14, 2017. Both of which are incorporated in their entirety by this reference.

FIELD OF THE INVENTION

The instant invention relates to a dental implant system.

BACKGROUND OF THE INVENTION

When treating patients with implants in order to provide a dental pros hesis or with replacement teeth it can happen that inserted tooth implants have to be removed from a jaw bone of a patient again. Main causes for removals of this type are infections around the dental implant (so-called peri-implantitis) and fractures of the tooth implant, the abutment or the attachment bolts.

Peri-implantitis is characterized by an inflammation of t soft tissue combined with a bone recession about the dental implant. This exposes a dental implant surface. Typically the dental implant surface has a certain amount of roughness that is generated by special treatment methods like, e.g., sand blasting or acid etching. The coarse treated dental implant surface helps bone accretion and bone integration (osteo integration). Since a dental implant surface in the oral cavity of the patient is exposed, the risk for a bacterial contamination of the dental implant surface increases. This can require eventually that the inserted dental implant has to be removed again since no method is known to date that is suitable to make a dental implant surface germ or bacteria free again that has once been infected by bacteria.

There are many causes for developing peri-implantitis. When attaching replacement teeth on dental implants typically a type of cement is used between the dental prosthesis and the abutment. A complete removal of excess cement is impossible quite frequently. Remaining cement residuals at the tooth implant and/or the replacement tooth can cause peri-implantitis. Furthermore, the bone recession can cause peri-implantitis since the bone recession can cause an exposure of the roughened tooth implant surface. This surface can then be populated by bacteria. The bacteria contamination can trigger the peri-implantitis.

Causes for a bone recess at the tooth implant surface are overloading the bone during surgery or tooth implant insertion, and/or an excessively thin bone coverage since the bone below a particular bone thickness can be prone to recession. Other causes for a bone recession and thus peri-implantitis can be tensions in the implant that are transmitted to the bone and that can lead to an overload of the bone during the healing of the tooth implant (healing phase) or while attaching the replacement tooth (prosthetic phase).

Peri-implantitis cannot only be caused by bacterial contamination of the tooth implant surface that is used for bone accretion but also by a bacterial contamination of the implant—abutment connection.

A generic dental implant system of this type is known from DE 10 2015 100 117 A1. Therein a replacement ring is proposed for replacing a removable annular material portion in a coronal portion of an insertion section of a tooth implant in order to remove a tooth implant surface that is infected by bacteria and to replace the infected tooth implant surface with an uncontaminated outer surface of the replacement ring.

BRIEF SUMMARY OF THE INVENTION

Thus it is an object of the invention to improve upon the known dental implant system so that a propensity for peri-implantitis is further reduced.

The object of the invention is achieved by the features of the independent claims. Advantageous improvements of the invention can be found in the dependent claims.

According to an aspect of the invention, a dental implant system is provided, comprising at least one tooth implant and a separate abutment which is attachable or attached at the tooth implant by an attachment bolt.

An abutment is typically defined as a connection element (mesostructure) between the tooth implant and the prosthesis, this means the visible tooth crown. The abutment is attached at the tooth implant by the attachment bolt, e.g. in that a bolt shaft of the attachment bolt is threadable or threaded into a central opening in the tooth implant that is provided with an interior thread.

Conventional tooth implants are fabricated from cP titanium (commercially pure titanium). This material has an elasticity modulus of approximately 105 GPa. By comparison, a jawbone has an elasticity modulus of 1-130 GPa. The strongly diverging elasticity moduli cause an uneven load distribution within the bone which can cause overloads in portions of the bone and thus a bone recession and also low load areas in portions of the bone (stress shielding) and a bone recession due to the uneven load distribution.

Thus, efforts have been made in the art to select a material for the tooth implant that has an elasticity modulus that is similar to the elasticity modulus of the bone. For example, U.S. Pat. No. 5,573,401 A discloses a tooth implant made from a titanium alloy Ti—Nb—Zr with a rather low elasticity modulus. This leads to an improved load distribution in the bone on the one hand side, however, on the other hand side to a higher load on the tooth prosthesis that is placed onto the tooth implant and can thus cause a loss of the tooth prosthesis.

Thus, it is provided according to a first aspect of the invention that the tooth implant is made from a first material which has an elasticity modulus between 15 GPa and 75 GPa and that the abutment is made from a second material which has an elasticity modulus of greater than 100 GPa wherein the attachment bolt is made from the first material or from the second material.

The term material includes pure materials as well as alloys which are made from various alloy components like, e.g., titanium alloys.

Thus an effective elasticity modulus of the dental implant system can be adjusted in the portion of the attachment bolt as needed. Using the second material for the abutment which has a greater elasticity modulus than the first material of the tooth implant yields a higher relative elasticity modulus for the pairing implant/attachment bolt in the portion of the tooth implant that is penetrated by the attachment bolt. Selecting the material of the attachment bolt from the first material or the second material and by selecting the length of the attachment bolt, the elasticity modulus can be adapted to the respective requirements in an optimum manner.

For the tooth implant which is inserted into the jawbone with an insertion section the first material provides a rather low elasticity modulus that is adapted to the bone. The elasticity modulus of the abutment is much higher than the elasticity modules of the first material. Under a chewing load the tooth implant transfers the highest loads onto the crestal bone adapting a length of the attachment bolt. Adapting a length of the attachment bolt as a function of geometry of the tooth implant helps to reduce a load transfer to the crestal bone.

Advantageously, the first material for the tooth implant 1 is a beta titanium alloy and the second material for the abutment 2 is cP titanium (commercially pure titanium).

Further advantageously, the first material and/or the second material are nano-structured according to a first aspect. Nano-structured material has an interior structure or a surface structure in a nanometer range (e.g., nanocomposite). Nano-structuring increases strength and in particular service life and in particular fatigue strength so that dimensions of the tooth implant and/or of the abutment can be reduced.

Additionally, nano-structured titanium or nano-structured titanium alloys have a much higher osteointegration capability compared to non-nano-structured materials. Tooth implants made from nano-structured material thus do not require surface coating or surface treatment. This facilitates a particularly advantageous configuration of the tooth implant that will be described infra with reference to a third aspect of the invention.

According to an improvement of the first aspect, the tooth implant can have an insertion section that includes a thread or a nail thread for anchoring the tooth implant in a jawbone and a coronal protrusion for an external connection of the tooth implant with the abutment or an internal recess for an internal connection of the tooth implant with the abutment, wherein the abutment is attachable or attached at the tooth implant by the external connection or by the internal connection.

Thus, the attachment bolt can be threaded into an opening that is configured in the coronal protrusion for an external connection between the abutment and the tooth implant or into an opening that is configured in the recess for an internal connection between the abutment and the tooth implant.

According to a second aspect, the invention is implemented by a dental implant system comprising at least one dental implant and a separate abutment which is attachable or attached at the dental implant in particular by an attachment bolt.

According to the second aspect, it is provided according to the invention that at least the tooth implant is made from titanium or from a titanium alloy at least at its surface that is nano-structured.

Made from titanium at its surface or from a titanium alloy which is nano-structured means that at least the outward oriented surface of the tooth implant but also portions of the tooth implant that are further inside or also the entire tooth implant is made from titanium or from a titanium alloy which is nano-structured.

According to an embodiment of the second aspect of the invention, the abutment can be made from titanium or from a titanium alloy which is nano-structured.

As stated supra with respect to an embodiment of the first aspect of the invention, the nano-structuring increases strength and in particular fatigue strength so that an overall size of the tooth implant and/or of the abutment can be reduced.

Nano-structured titanium or a nano-structured titanium alloy has a significantly increased osteointegration capability compared to non-nano-structured materials. Tooth implants from nano-structured material thus do not require surface coating or surface treatment. This facilitates a particularly advantageous configuration that is described infra in the context of the third embodiment.

According to a third aspect, the invention is implemented by a dental implant system, comprising a separate abutment and a tooth implant at which the abutment is attachable or attached by an attachment bolt. The tooth implant includes an insertion section for anchoring in a jawbone that is provided with a screw thread or a nail thread, a multifunction section that is adjacent to the insertion section at a coronal side, wherein the multifunction section includes a first cone that tapers in a coronal direction and an attachment section which is adjacent to the multifunction section in the coronal direction wherein the attachment section includes a second cone that tapers in the coronal direction and that is directly adjacent to the first cone, and that is configured as a coronal protrusion, wherein an external cone connection is provided at least between the second cone and the abutment.

A third aspect of the invention is implemented in that the first cone and the second cone have an identical cone angle and a common smooth enveloping surface. Put differently, the first cone transitions directly into the second cone continuously and without a shoulder and without a change of the cone angle.

Viewed from the coronal side of the tooth implant, the first cone forms an extension of the second cone which exclusively forms the seat of the abutment so that it is possible on the one hand side to replace an original abutment with a replacement abutment with a greater axial length which is not only supported on the second cone but also at least partially on the first cone. A longer replacement abutment of this type can counteract a gingival recession and a possible exposure of the tooth implant.

When there are higher jaw loads to be expected, a higher mechanical stability can be achieved by an axially longer connection surface between the tooth implant and the replacement abutment. In case of peri-implantitis, only the contaminated surface in the portion of the second cone needs to be removed. Due to the conical shape of the second cone this can be achieved in a particularly simple manner by a milling device. Since nano-structured titanium or a nano-structured titanium alloy does not require any surface coating for osteointegration, an augmentation and repeated osteoingration is possible after removal of the surface corroded or contaminated material.

On the other hand side also the insertion section of the tooth implant can be threaded deep enough into the jaw bone so that at least a portion of the first cone is arranged below the bone line which advantageously increases flexibility of the tooth implant with respect to threading depth. Namely in conventional tooth implants their rough surface always has to be covered by bone. This, however, cannot always be assured since the bone often extends at a slant angle relative to the tooth implant axis. According to the third aspect, however, it only has to be assured that the insertion section is covered by bone.

Consequently the multi-functional section that includes the first cone or that is formed by the first cone provides several functions, namely in that the first cone facilitates on the one hand side using the longer replacement abutment described supra and on the other hand side flexibly inserting the tooth implant depending whether the first cone of the multi-functional section stores a longer replacement abutment at least partially or protrudes into the jaw bone at least by a certain distance.

Advantageously the first cone and/or the second cone are configured without an external screw thread or nail thread so that the tooth implant includes a screw thread or a nail thread exclusively at the insertion section for threading or driving into the jaw bone.

An embodiment according to the third aspect of the invention can therefore include a replacement abutment that is longer in the axial direction wherein the replacement abutment extends along an axial direction of the tooth implant in an apex direction beyond the second cone into the first cone.

In an embodiment according to the third aspect of the invention the replacement abutment can contact the tooth implant at least in a portion of an axial extension of the second cone and additionally at least in a portion of the axial extension of the first cone, so that a stiffer connection between these elements is achieved due to the clamping forces imparted by the attachment bolt and due to an increased contact surface between the replacement abutment and the tooth implant.

In an embodiment according to the third aspect of the invention the insertion section can taper conically towards the apex end of the tooth implant.

The invention also relates to any and all combinations of a dental implant system according to the first, second and third aspect or their embodiments.

BRIEF DESCRIPTION OF THE DRAWINGS

The invention is subsequently described based on an embodiment with reference to an appended drawing figure, wherein.

DETAILED DESCRIPTION OF THE INVENTION

Figure 1:
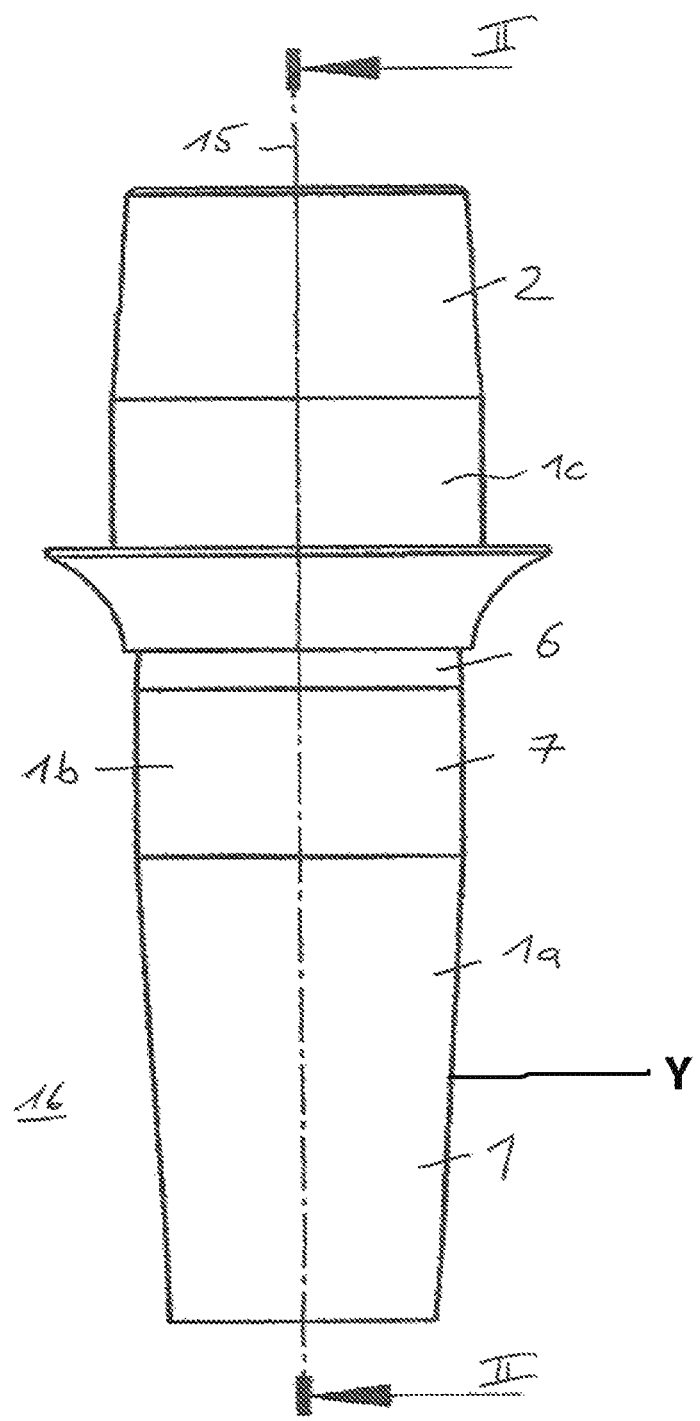
FIG. 1 illustrates a side view of a dental implant system according to and advantageous embodiment of the invention; comprising a tooth implant, an attachment bolt and a first abutment.

The dental implant system illustrated in FIG. 1 includes a tooth implant 1, a separate abutment 2 and an attachment screw 3 that attaches the abutment 2 at the tooth implant 1.

Figure 2:
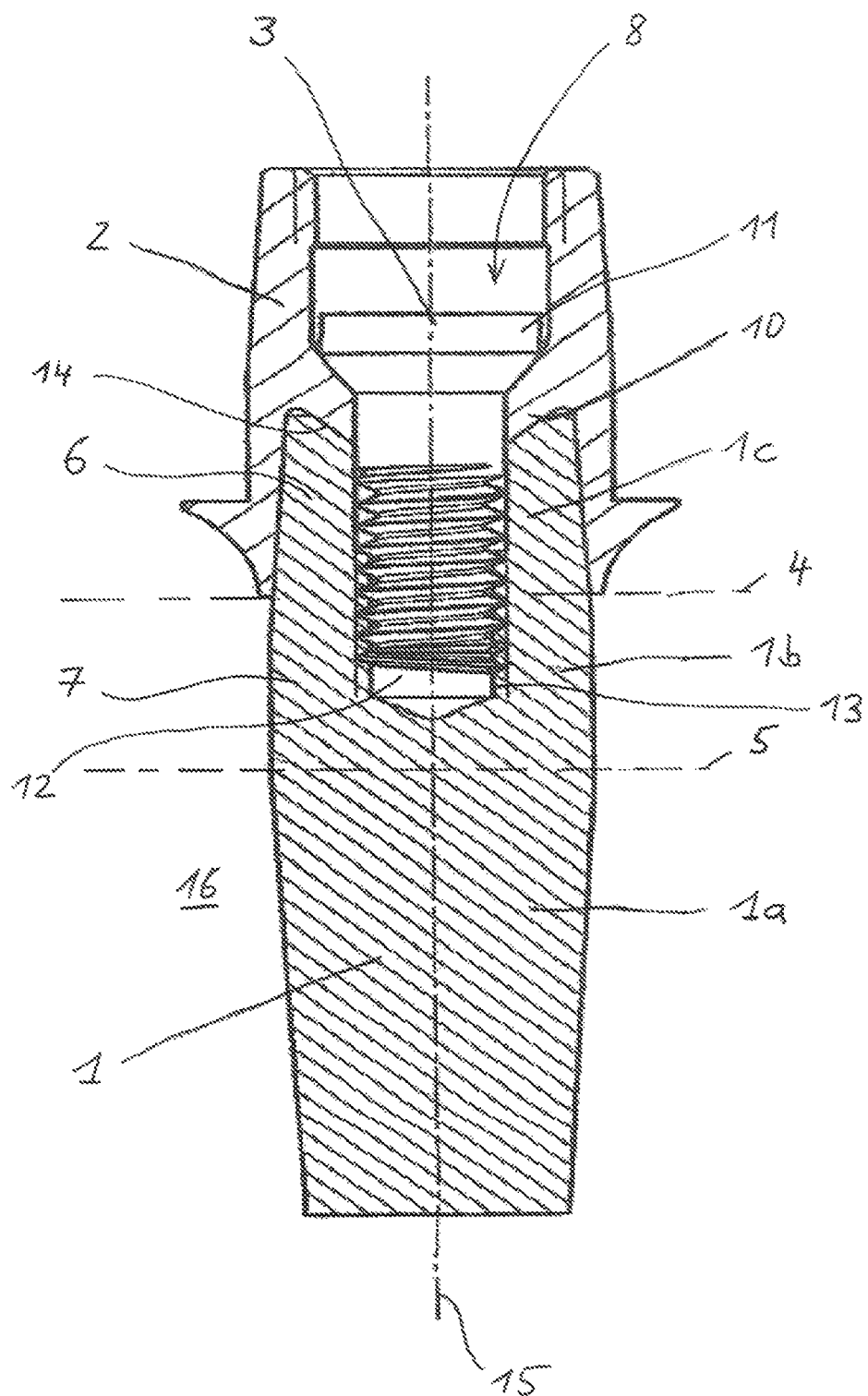
FIG. 2 illustrates a longitudinal sectional view of the dental implant system along the line II-II of FIG. 1.

As evident from FIG. 2 the tooth implant 1 includes an insertion section 1a for anchoring the tooth implant 1 in a jaw bone that is provided with a screw thread or a nail thread Y, a multi-functional section 1b that is adjacent to the insertion section 1a in a coronal direction and an attachment section 1c that is adjacent to the multi-functional section 1b in a coronal direction.

The multi-functional section 1b includes a first cone 7 that tapers in a coronal direction from an end of the insertion section 1a while the attachment section 1c includes a second cone 6 that tapers in the coronal direction and that is directly adjacent to the first cone 7 wherein the second cone 6 forms a coronal protrusion of the tooth implant 1.

An external cone connection is provided at least between the second cone 6 and the abutment 2. Thus, an inner pass through opening 8 of the abutment 2 includes an inner cone 9 which is configured complementary to the second cone 6 of the tooth implant 1 with respect to the cone angle. Thus, the inner cone 9 is then arranged at an apex end of the abutment 2 so that the abutment 2 can be placed on the second cone 6 from the coronal side.

Figure 3:
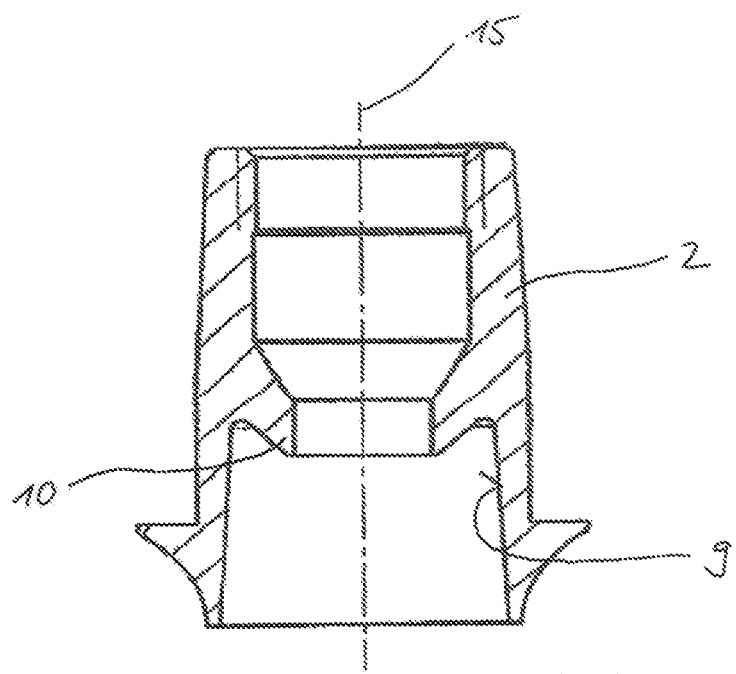
FIG. 3 illustrates an individual sectional view of the first abutment of the dental implant system according to FIG. 1.
Figure 4:
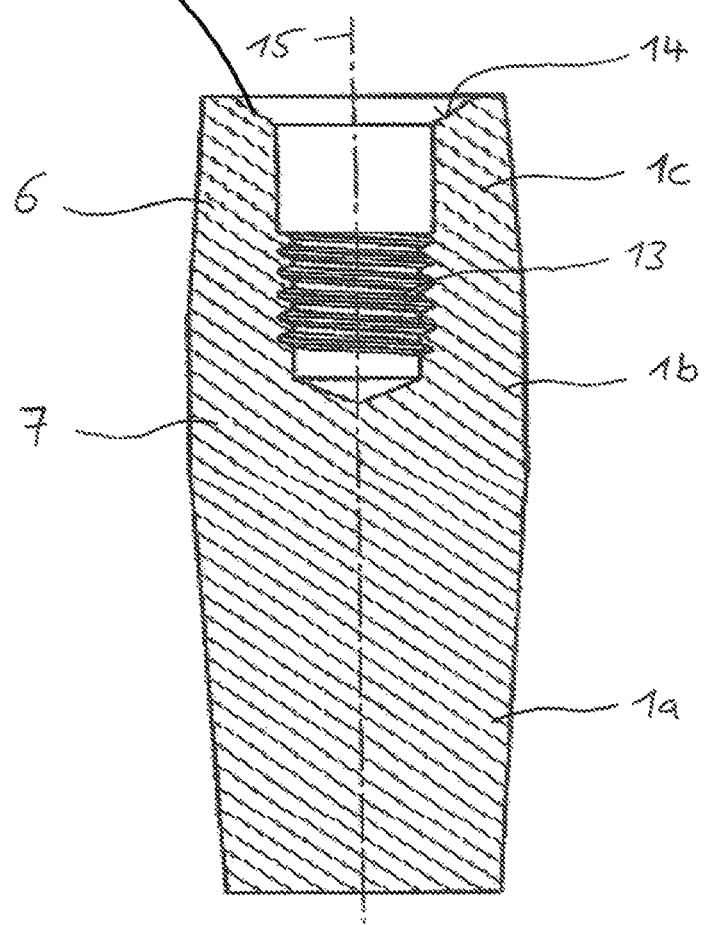
FIG. 4 illustrates a sectional view of the tooth implant of the dental implant system according to FIG. 1.
Figure 5:
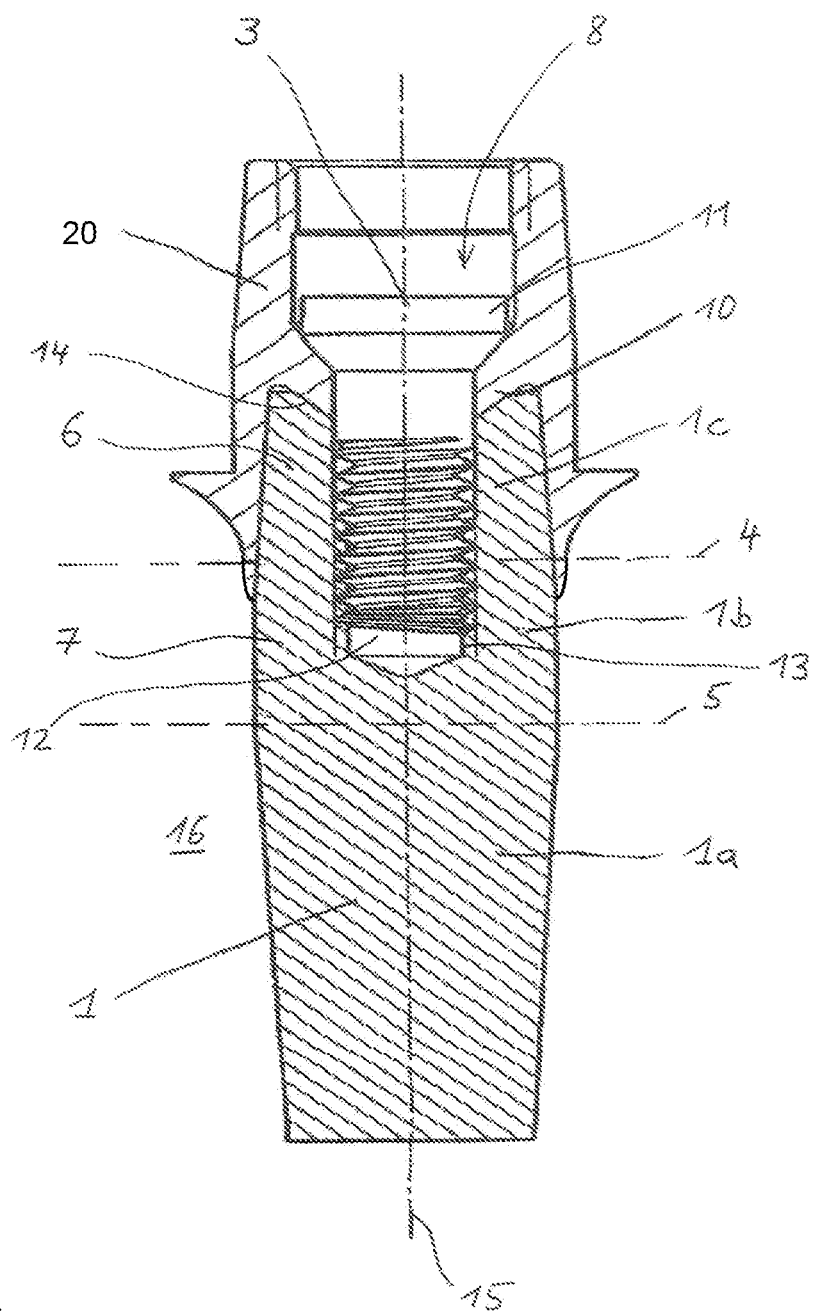
FIG. 5 illustrates a longitudinal sectional view of the dental implant system showing a replacement abutment.

As illustrated in particular in FIG. 3 the pass through opening 8 of the abutment 2 includes a collar 10 at the coronal end of the inner cone 9 wherein the collar 10 extends e.g. in the apex direction with a bevel or at a slant angle in the cross sectional view, c.f. FIG. 3, wherein the collar 10 is complementary to a coronal annular edge surface 14 of a central threaded dead hole 13 in the tooth implant 1 (FIG. 2 and FIG. 4). Thus, when the abutment 2 is placed onto the second cone 6 of the tooth implant with the inner collar 10 (FIG. 2) a centering form locking internal connection X is provided between the collar 10 and the annular edge surface 14.

A bolt head 11 of the attachment bolt 3 is locked against a side of the collar 10 that is oriented away from the edge surface 14 wherein a bolt shaft 12 is threaded into the threaded dead hole 13 of the tooth implant 1 in order to fix the abutment 2 at the tooth implant 1 in the center position.

In the illustrated embodiment an apex end of the abutment 2 extends in a direction of the tooth implant axis 15 to a level at the tooth implant 1 with reference to the tooth implant axis 15 wherein the level is designated in FIG. 2 with the reference numeral 4. On the other hand side the insertion section 1a is threaded into the jaw bone 16 to a level at the tooth implant 1 that is designated in FIG. 2 with reference numeral 5, wherein the level 5 is measured relative to the tooth implant axis 15 that extends in the axial direction. The first cone 7 of the multi-functional section 1b advantageously extends between the level 5 and the level 4 in a direction of the tooth implant axis 15.

The first cone 7 and the second cone 6 advantageously include the same cone angle and a common smooth enveloping surface. Put differently the first cone 7 transitions into the second cone 6 directly and continuously and without a shoulder and without a change of cone angle. Thus, the second cone 6 forms a direct continuation of the first cone 7.

Viewed from a coronal side of the tooth implant 1 the first cone 7 forms an extension of the second cone 6 which forms a centering seat for the abutment 2, so that it is possible on the one hand side to replace the originally used abutment 2 with a replacement abutment 20 that has a greater axial length. For example the apex end of the replacement abutment 20 can theoretically extend in the direction of the tooth implant axis 15 to the level 5 in FIG. 2 where the insertion section 1a to starts due to the continuous and smooth transition of the second cone 6 into the first cone 7.

The longer replacement abutment 20 is an effective response to a gingival recession and a possible exposure of the tooth implant. When higher chewing loads are to be expected the axially longer connection surface between the tooth implant 1 and the replacement abutment 20 provides higher mechanical stability. In case of peri-implantitis merely the contaminated surface in the portion of the second cone 6 needs to be removed.

On the other hand side also the insertion section 1a of the tooth implant 1 can be threaded into the jaw bone deeper, e.g. far enough so that the jaw bone crest of the jaw bone reaches the level 4 in FIG. 2 on which the apex end of the abutment 2 is arranged. Then at least a portion of the first cone 7 is below the jaw line which advantageously improves flexibility with respect to the screw in depth of the tooth implant 1 into the jaw bone. Thus it also has to be assured that the insertion section 1a is covered by bone material.

Consequently the multi-functional section 1*b* that includes the first cone 7 or that is formed by the first cone 7 provides several functions in that it facilitates on the one hand side replacing an abutment 2 with a longer replacement abutment 20 and on the other hand side a flexible insertion of the tooth implant 1 into the jaw bone.

Furthermore the tooth implant 1 is made from a first material which has an elasticity modulus between 15 GPa and 75 GPa. The abutment is made from a second material that has an elasticity modulus of greater than 100 GPa. The attachment bolt 3 can be made from the first material or the second material.

The term "material" includes pure materials and also alloys which are made from several alloy components like e.g. titanium alloys.

Thus, the effective elasticity modulus of the dental implant system in the portion of the attachment screw 3 can be adapted as required. Using the second material for the abutment 2 that has a greater elasticity modulus compared to the first material of the tooth implant 1 yields a higher relative elasticity modulus for the pairing of the tooth implant attachment bolt in the portion of the threaded dead hole 13 of the tooth implant 1 that is penetrated by the attachment screw 3. Selecting the material of the attachment screw 3 within the first material or the second material and a length of the attachment screw 3 facilitates adapting the elasticity modulus in an optimum manner to the requirements.

In the portion of the jaw bone, this means within the insertion section 1*a* of the tooth implant 1 the elasticity modulus of the first material is advantageously low. In the portion of the abutment 2 the elasticity modulus is higher in comparison. Under a chewing load the tooth implant 1 imparts greater loads onto the crestal bone. Adapting a length of the attachment bolt 3 as a function of a geometry of the tooth implant 1 helps to reduce a load transfer to the crestal bone.

In a particularly advantageous manner a beta titanium alloy is provided as a first material for the tooth implant 1 and as a second material for the abutment 2 cP-titanium (commercially pure titanium) is provided.

Additionally the first material and/or the second material are nano structured. Nano structured material has an inner structure or a surface structure in a nanometer range (e.g. nano composite). A nano structure of this type increases strength and in particular fatigue strength so that an overall size of the tooth implants can be advantageously reduced.

Nano structured titanium or a nano structured titanium alloy has a significantly increased osteo integration capability compared to non nano structured materials. Tooth implants made from nano structured material, therefore do not require surface coating or surface treatment. This facilitates the advantageous configuration of the tooth implant 1 with the first cone 7 and the second cone 6 described supra.

REFERENCE NUMERALS AND DESIGNATIONS

1 tooth implant
1*a* insertion section
1*b* multi-functional section
1*c* attachment section
2 abutment
3 attachment bolt
4 level
5 level
6 second cone
7 first cone
8 pass through opening
9 inner cone
10 collar
11 bolt head
12 bolt shaft
13 threaded bore hole
14 edge surface
15 tooth implant axis
16 jaw bone
X internal connection
Y screw thread or nail thread

What is claimed is:

1. A dental implant system, comprising:
   separate first abutment,
   a separate second abutment, which is axially longer than the first abutment, and which is a replacement abutment for the first abutment,
   a tooth implant where the first abutment or the second abutment attached by an attachment bolt, the tooth implant including:
   an insertion section configured to anchor the tooth implant in a jawbone and provided with a screw thread or a nail thread,
   a multi-functional section that is adjacent to the insertion section in a coronal direction, and that includes a first cone that tapers in the coronal direction,
   an attachment section that is adjacent to the multi-functional section in the coronal direction, and that includes a second cone that tapers in the coronal direction so that the first cone and the second cone share a longitudinal axis and the second cone extends in the coronal direction from the first cone,
   wherein the second cone is configured as a coronal protrusion,
   wherein an external cone connection is provided at least between the second cone and the first abutment, and
   wherein the second cone exclusively forms a seat for the first abutment, and
   wherein the first cone and the second cone have an identical cone angle and are defined by a common smooth enveloping surface,
   wherein the first abutment includes a first coronal end surface and the second abutment includes a second coronal end surface,
   wherein the second coronal end surface of the second abutment is arranged relative to a coronal edge surface of the tooth implant where the first coronal end surface of the first abutment was when the first abutment is replaced by the second abutment,
   wherein the second abutment extends in an axial direction of the tooth implant axis in an apical direction towards the jaw bone beyond the second cone into the first cone when the first abutment is replaced by the second abutment, whereby the second abutment contacts the tooth implant at least along a portion of the axial extension of the second cone and additionally at least along a portion of the axial extension of the first cone, so that the second abutment extends further towards the jaw bone than the first abutment.

2. The dental implant system according to claim 1, wherein the insertion section tapers conically towards an apical end of the tooth implant.

3. The dental implant system according to claim 1, wherein the tooth implant is made from titanium or a titanium alloy that is nano-structured at least at a surface of the tooth implant.

4. The dental implant system according to claim 1, wherein the first abutment and the second abutment is made from titanium or a titanium alloy which is nano-structured.

5. The dental implant system according to claim 1, wherein the first or second abutment is attachable or attached at the tooth implant by the attachment bolt,
  wherein the tooth implant is made from a first material with an elasticity modulus between 15 GPa and 75 GPa,
  wherein at least one of the first or second abutment is made from a second material with an elasticity modulus greater than 100 GPa, and
  wherein the attachment bolt is made from the first material or the second material.

6. The dental implant system according to claim 1, wherein the tooth implant is made from a beta titanium alloy at least at a surface of the tooth implant.

7. The dental implant system according to claim 6, wherein the beta titanium alloy is nano-structured.

8. The dental implant system according to claim 1, wherein at least one of the first or second abutment is made from cP-titanium.

9. The dental implant system according to claim 8, wherein the cP-titanium is nano-structured.

10. The dental implant system according to claim 1, wherein the attachment bolt is threadable into an opening that is formed at least in the coronal protrusion when the external connection is provided between the abutment and the tooth implant.

11. A dental implant system, composing:
  a separate first abutment,
  a separate second abutment, which is axially longer than the first abutment, and which is a replacement abutment for the first abutment,
  a tooth implant where the first abutment or the second abutment is attached by an attachment bolt, the tooth implant including:
  an insertion section configured to anchor the tooth implant in a jawbone and provided with a screw thread or a nail thread,
  a multi-functional section that is adjacent to the insertion section in a coronal direction, and that includes a first cone that tapers in the coronal direction,
  an attachment section that is adjacent to the multi-functional section in the coronal direction and that includes a second cone that tapers in the coronal direction so that the first cone and the second cone share a longitudinal axis and the second cone extends in the coronal direction from the first cone,
  wherein the second cone is configured as a coronal protrusion,
  wherein an external cone connection is provided at least between the second cone and the first abutment, and
  wherein the second cone exclusively forms a seat for the first abutment, and
  wherein the first cone and the second cone have an identical cone angle and are defined by a common smooth enveloping surface,
  wherein a first opening of the first abutment includes a first collar and a second opening of the second abutment includes a second collar, wherein the first collar and the second collar are complementary to a coronal annular edge surface of the implant, wherein a position of the first collar relative to a coronal end of the first abutment and a position of the second collar relative to a coronal end of the second abutment are essentially identical when the first abutment is replaced by the second abutment,
  wherein the second abutment extends in an axial direction of the tooth implant axis in an apical direction towards the jaw bone beyond the second cone into the first cone when the first abutment is replaced by the second abutment, whereby the second abutment contacts the tooth implant at least along a portion of the axial extension of the second cone and additionally at least along a portion of the axial extension of the first cone, so that the second abutment extends further towards the jaw bone than the first abutment.

* * * * *